US008457681B2

(12) United States Patent
Nakada

(10) Patent No.: US 8,457,681 B2
(45) Date of Patent: Jun. 4, 2013

(54) WIRELESS BASE STATION, WIRELESS COMMUNICATION SYSTEM, METHOD FOR CONTROLLING TRANSMISSION POWER OF WIRELESS BASE STATION, AND STORAGE MEDIUM OF PROGRAM FOR CONTROLLING TRANSMISSION POWER OF WIRELESS BASE STATION

(75) Inventor: Suguru Nakada, Tokyo (JP)

(73) Assignee: NEC Corporation, Tokyo (JP)

( * ) Notice: Subject to any disclaimer, the term of this patent is extended or adjusted under 35 U.S.C. 154(b) by 100 days.

(21) Appl. No.: 13/130,951

(22) PCT Filed: Nov. 4, 2009

(86) PCT No.: PCT/JP2009/068807
§ 371 (c)(1),
(2), (4) Date: Jun. 15, 2011

(87) PCT Pub. No.: WO2010/064515
PCT Pub. Date: Jun. 10, 2010

(65) Prior Publication Data
US 2011/0250927 A1    Oct. 13, 2011

(30) Foreign Application Priority Data

Dec. 3, 2008    (JP) .................................. 2008-308788

(51) Int. Cl.
*H04B 7/00*    (2006.01)
(52) U.S. Cl.
USPC .............. 455/525; 455/522; 455/464; 455/62
(58) Field of Classification Search
USPC ............. 455/69, 522, 422.1, 452.2, 464, 500, 455/524, 525, 62, 67.11, 561
See application file for complete search history.

(56) References Cited

U.S. PATENT DOCUMENTS

| 2004/0176094 A1* | 9/2004 | Kim et al. ..................... 455/438 |
| 2009/0017855 A1* | 1/2009 | Kwon et al. .................. 455/509 |
| 2009/0081952 A1* | 3/2009 | Lee et al. ..................... 455/41.2 |
| 2009/0305741 A1* | 12/2009 | Takeuchi et al. .............. 455/561 |

FOREIGN PATENT DOCUMENTS

| JP | 5-284088 A | 10/1993 |
| JP | 7-298345 A | 11/1995 |
| JP | 2004222152 A | 8/2004 |

(Continued)

OTHER PUBLICATIONS

International Search Report for PCT/JP2009/068807 mailed Feb. 9, 2010.

Primary Examiner — John J Lee

(57) ABSTRACT

A connection request signal generation unit transmits a connection request signal to a selected neighboring base station selected from neighboring base stations existing around. A common channel reception processing unit, when receiving a response signal which corresponds to the connection request signal, from the selected neighboring base station, stores a value of transmission power with which the connection request signal is transmitted most recently, as a response time transmission power, in correspondence to the selected neighboring base station, and determines a minimum response transmission power of which value is the smallest among at least one response-time transmission power after storing the at least one response-time transmission power for the neighboring base stations; and calculate a transmission power of a common channel with which the own station should transmit, based on the minimum response transmission power. An ordinary processing unit performs a transmission through a common channel by using the common channel transmission power.

15 Claims, 7 Drawing Sheets

FOREIGN PATENT DOCUMENTS

| | | |
|---|---|---|
| JP | 2004242076 A | 8/2004 |
| JP | 2005223466 A | 8/2005 |
| JP | 2006101442 A | 4/2006 |
| JP | 2006135673 A | 5/2006 |
| JP | 2007329758 A | 12/2007 |
| JP | 2009225039 A | 10/2009 |

* cited by examiner

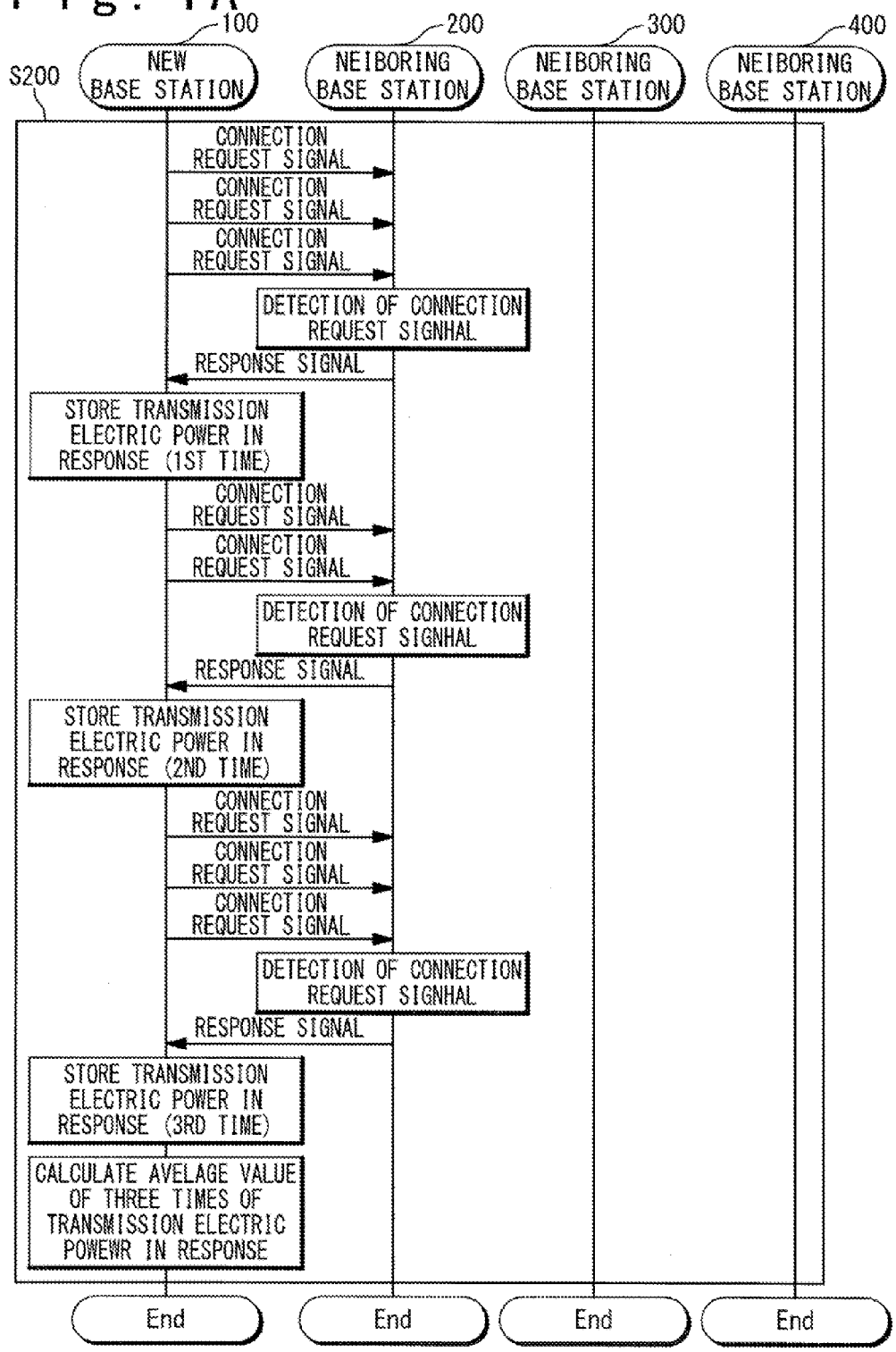

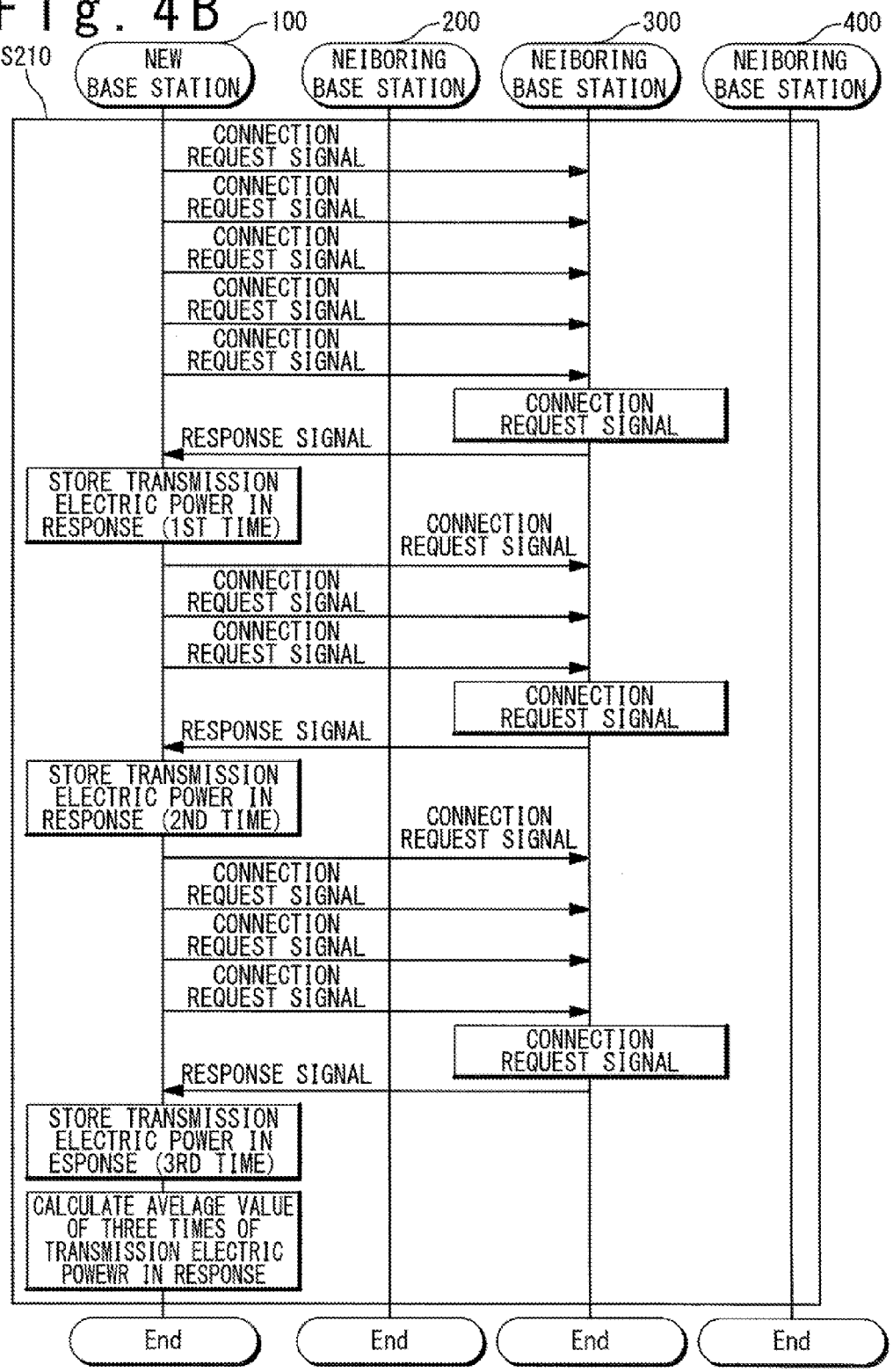

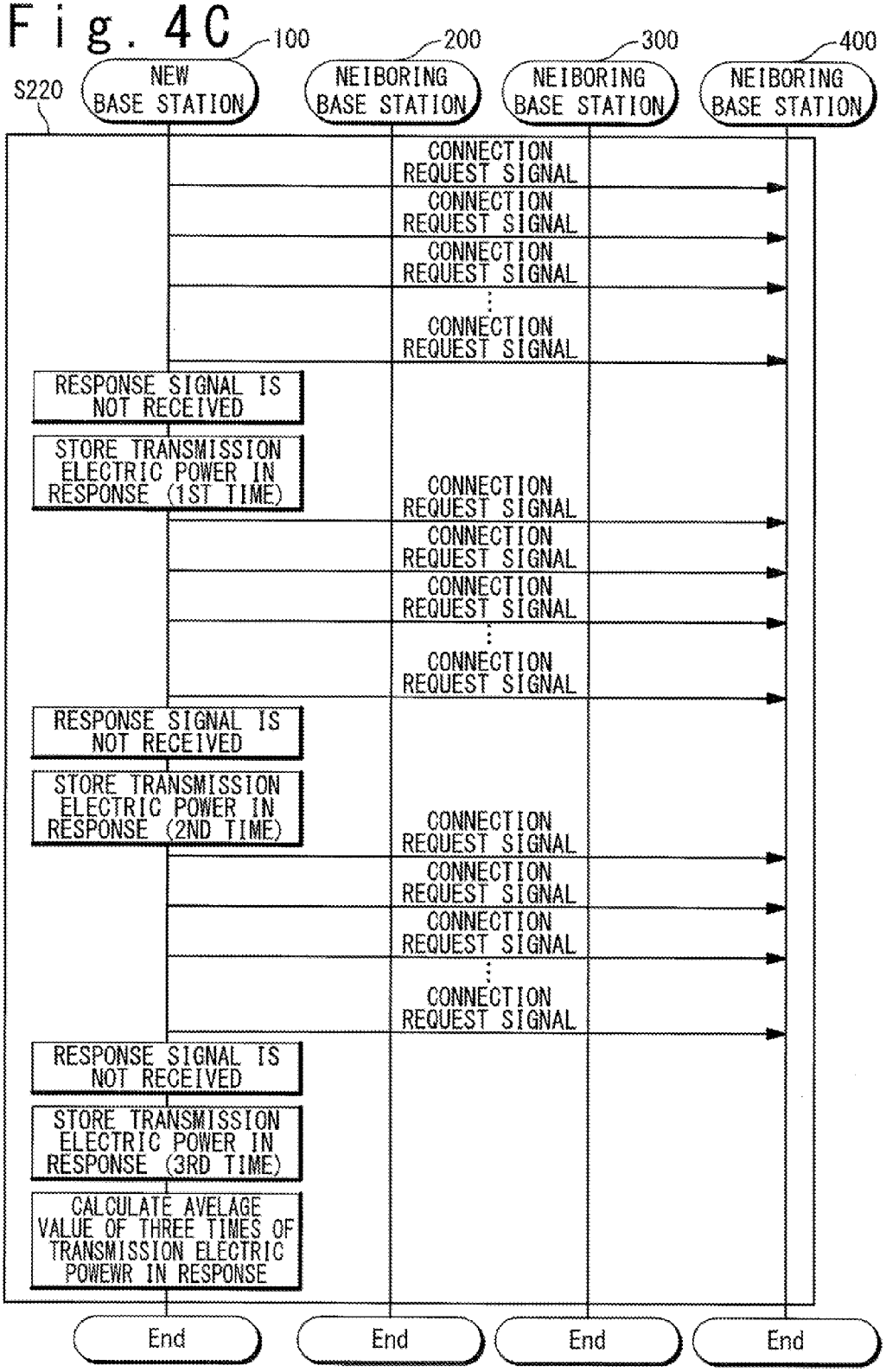

WIRELESS BASE STATION, WIRELESS COMMUNICATION SYSTEM, METHOD FOR CONTROLLING TRANSMISSION POWER OF WIRELESS BASE STATION, AND STORAGE MEDIUM OF PROGRAM FOR CONTROLLING TRANSMISSION POWER OF WIRELESS BASE STATION

BACKGROUND ART

The present invention relates to a wireless base station, and in particular, relates to a wireless base station which autonomously performs transmission electric power control.

In a wireless communication system, transmission power of radio waves (transmission waves) transmitted from each wireless base station, is influenced by an area (size) of a wireless area (cell) established by the wireless base station. On the other hand, transmission waves from a certain wireless base station, can be interference waves against transmission waves transmitted from another wireless base station, in a cell established by the another wireless base station. For this reason, transmission power of a transmission wave transmitted from each wireless base station needs to be determined by fully considering balance with transmission power of transmission waves transmitted from other wireless base stations present around the wireless base station. In the past, an administrator of a wireless communication system determines transmission power of a transmission wave of a new wireless base station by considering the surrounding radio wave condition and the like, when a new wireless base station is set. However, such human work requires great labor. For this reason, a method for appropriately and effectively determining transmission power of a transmission wave of a wireless base station, has been required. Related techniques for solving the above problem, have been disclosed as follows.

Japanese Patent Application Publication JP-P2004-242076A discloses a wireless access point which can appropriately set transmission power for determining an own radiowave reach area, in relation to adjacent wireless access points. A wireless access point according to Japanese Patent Application Publication JP-P2004-242076A is a wireless access point set in any position to build a wireless network. The wireless access point according to Japanese Patent Application Publication JP-P2004-242076A has a first means and a second means. The first means transmits a test radio wave with initial power which is preliminarily determined as transmission power for determining a radiowave reach area, and judges whether a response signal is received or not from other adjacent wireless access points thereafter, in order to determine initial power based on the judgment result and sets the initial power as own transmission power. The second means transmits a test radio wave with altered power as a result of change from the initial power based on the judgment result in the first setting means, and judges whether a response signal is received or not from other adjacent wireless access points thereafter, in order to determine altered power based on the judgment result and sets the altered power as own transmission power. According to the wireless access point according to Japanese Patent Application Publication JP-P2004-242076A, it is possible to effectively position a small number of access points since own transmission power can appropriately be set in relation to other adjacent access points.

Japanese Patent Application Publication JP-P2006-101442A discloses a variable-cell mobile communication system which can avoid a situation where change in cell size frequently occurs, and which can cope with a cessation of operation of a wireless base station. The mobile communication system according to Japanese Patent Application Publication JP-P2006-101442A, is a mobile communication system for providing wireless communication service by using a plurality of cells of which sizes can be changed into multiple levels. The mobile communication system according to Japanese Patent Application Publication JP-P2006-101442A, has a means to measure a traffic volume in each cell, and a means to store a first threshold value and a second threshold value. The first threshold value is provided as an upper limit of a traffic volume in order to judge whether a cell size should be changed or not, to a cell size which is smaller by one level. The second threshold value, which is smaller than the first threshold value, is provided as a lower limit of a traffic volume in order to judge whether or not the cell size which is smaller by one level, should be changed back into the original cell size. The mobile communication system according to Japanese Patent Application Publication JP-P2006-101442A, is characterized in that a cell size of each cell is automatically changed in accordance with a traffic volume which is successively measured, by using the above means. According to the mobile communication system of Japanese Patent Application Publication JP-P2006-101442A, it is possible to make the mobile communication system operate stably without being unstable around a specific threshold value, and avoid a situation in which handover frequently occurs.

Japanese Patent Application Publication JP-A-Heisei 5-284088 discloses a transmission power controlling method which controls transmission power in accordance with a ever-changing transmission loss situation of an own station, and covers a cell of the own station with a necessary reception level. The transmission power controlling method according to Japanese Patent Application Publication JP-A-Heisei 5-284088, is used in a mobile communication method using cells where a coverage area includes a plurality of cells, a base station is positioned in correspondence to each cell, and a mobile station communicates with one of a plurality of base stations. When a base station transmits a radio wave for judging transmission power, abase station adjacent to the base station detects a reception level of the radio wave for judging transmission power. A control base station, which controls abase station and an adjacent base station, notifies the base station of the reception level detected by the adjacent base station. The base station determines a telegraph power value of the own station based on the notified reception level. According to the transmission power controlling method of Japanese Patent Application Publication JP-A-Heisei 5-284088, it is possible to secure a reception level in a cell of the own station even when a reception level in the cell of the own station changes from moment to moment.

A wireless access point according to Japanese Patent Application Publication JP-P2004-242076A, simultaneously transmits a pilot signal to a plurality of neighboring base stations, and determines transmission power based on a response from each of the neighboring base stations. In an actual wireless communication system however, such processing is not so likely to be applicable since a frequency and a spread code (in the case of a CDMA method: Code Division Multiple Access) used for each base station, are different. In addition, organizing cells with such processing causes interference since cells overlap considerably. While a frequency needs to be changed in order to avoid interference, effective determination of a frequency needs to have a server for controlling transmission power and frequencies. The mobile communication system according to Japanese Patent Application Publication JP-P2006-101442A changes transmission power based on a traffic volume of a wireless base station. For this reason, the mobile communication system according to Japanese Patent Application Publication JP-P2006-101442A needs to have a base station controlling device for collecting a traffic volume and transmitting a control command based on the traffic volume, for transmission power control of a wireless base station. The transmission power controlling method according to Japanese Patent Application Publication JP-A-Heisei 5-284088 needs to have a control base station which receives a transmission wave from a wireless base station and measures a reception level, to notify the wireless base station of the reception level, for transmission power control of a wireless base station.

Citation List

Patent Literature
[PTL1]
Japanese Patent Application Publication JP-P2004-242076A
[PTL2]
Japanese Patent Application Publication JP-P2006-101442A
[PTL3]
Japanese Patent Application Publication JP-A-Heisei 5-284088
[PTL4]
Japanese Patent Application Publication JP-P2005-223466A
[PTL5]
Japanese Patent Application Publication JP-P2004-222152A

SUMMARY OF INVENTION

An object of the present invention is to provide a wireless base station which can autonomously control transmission power of a transmission wave of the own station in order to reduce interference with transmission waves of other stations.

According to the present invention, a wireless base station includes a connection request signal generation unit, a common channel reception processing unit, and an ordinary processing unit. The connection request signal generation unit transmits a connection request signal to a selected neighboring base station selected from neighboring base stations existing around. The common channel reception processing unit, when receiving a response signal which corresponds to the connection request signal, from the selected neighboring base station, stores a value of transmission power with which the connection request signal is transmitted most recently, as a response time transmission power, in correspondence to the selected neighboring base station. The common channel reception processing unit determines a minimum response transmission power of which value is the smallest among at least one response-time transmission power after storing the at least one response-time transmission power for the neighboring base stations; and calculate a transmission power of a common channel with which the own station should transmit, based on the minimum response transmission power. The ordinary processing unit performs a transmission through a common channel by using the common channel transmission power.

According to the present invention, a wireless communication system of the present invention includes more than one above-mentioned wireless base stations.

According to the present invention, a transmission power control method includes: a step of transmitting a connection request signal to a selected neighboring base station selected from neighboring base stations existing around; a step of storing, when receiving a response signal which corresponds to the connection request signal, from the selected neighboring base station, a value of transmission power with which the connection request signal is transmitted most recently, as a response time transmission power, in correspondence to the selected neighboring base station; a step of determining a minimum response transmission power of which value is the smallest among at least one response-time transmission power after storing the at least one response-time transmission power for the neighboring base stations; a step of calculating a transmission power of a common channel with which the own station should transmit, based on the minimum response transmission power; and a step of performing a transmission through a common channel by using the common channel transmission power.

According to the present invention, a storage medium stores a computer program for making a computer execute the method for controlling transmission power of a wireless base station.

According to the present invention, it is possible to provide a wireless base station which can autonomously control a transmission power of a transmission wave of the own station, in order to reduce interference with transmission waves of other stations.

BRIEF DESCRIPTION OF DRAWINGS

An object, effect, and characteristics of the invention will be more clarified from description of some exemplary embodiments together with the attached drawings, in which:

FIG. 4A is a transmission power determining sequence performed between the new base station 100 and neighboring base stations 200 to 400 according to the present exemplary embodiment;

FIG. 4B is a transmission power determining sequence performed between the new base station 100 and the neighboring base stations 200 to 400 according to the present exemplary embodiment;

FIG. 4C is a transmission power determining sequence performed between the new base station 100 and the neighboring base stations 200 to 400 according to the present exemplary embodiment.

DESCRIPTION OF EMBODIMENTS

Wireless base stations according to some exemplary embodiments of the present invention will be described below with reference to the drawings. In the present exemplary embodiment, description will be given by using a mobile phone system using the W-CDMA (Wideband Code Division Multiple Access) system provided by the 3GPP (Third Generation Partnership Project (http://www.3gpp.org)).

[Description of a Configuration of a Wireless Communication System Having Wireless Base Stations]

Figure 1:
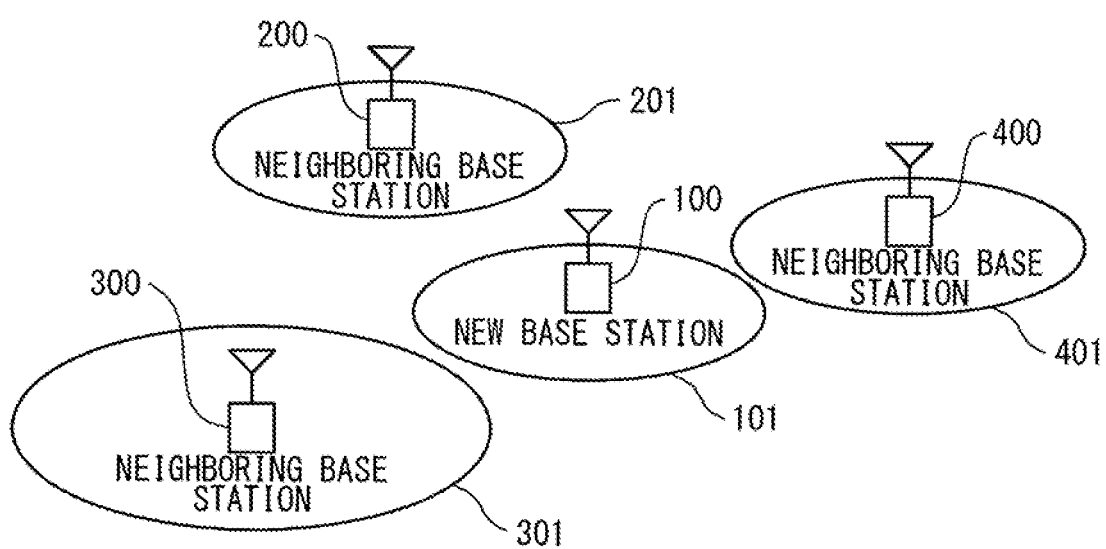
FIG. 1 is a configuration diagram of a wireless communication system having wireless base stations according to a present exemplary embodiment.

Firstly, a configuration of a wireless communication system having wireless base stations according to the present exemplary embodiment will be described. FIG. 1 is a configuration diagram of the wireless communication system having wireless base stations according to the present exemplary embodiment. A base station 100 is a wireless base station (hereinafter referred to as the new base station 100) which is newly set in the wireless communication system. Base stations 200, 300, and 400 are existing wireless base stations set in the neighborhood of the new base station 100 in the wireless communication system (hereinafter referred to as the neighboring base stations 200, 300, and 400 respectively). The new base station 100 and the neighboring base stations 200 to 400 are wireless base stations having basically a same configuration and function to each other, and only for simplification of explanation, they are named differently. That is to say, the wireless communication system according to the present exemplary embodiment is a wireless communication system having a plurality of new base stations 100. The new base station 100, and the neighboring base stations 200 to 400 are connected to a higher-level device of the wireless communication system such as a media gateway, a switchboard, and various servers, through such a communication network as a dedicated line network and the Internet (not shown). A mobile terminal accessing the wireless communication system can perform voice communication with other mobile terminals and perform data communication with web servers placed on the Internet, through the new base station 100 and the neighboring base stations 200 to 400. The present invention relates to transmission power control of each wireless base station existing in a wireless communication system. For this reason, general system structures and communication control methods in such a wireless communication system are not described in detail. In FIG. 1, the wireless communication system according to the present exemplary embodiment has four wireless base stations. This is due to the simplification of description, and the wireless communication system can have a larger number of wireless base stations.

Next, a wireless area 101 is a wireless area which the new base station 100 establishes. In the same way, wireless areas 201, 301, and 401 are established by the neighboring base stations 200, 300, and 400 respectively. According to the W-CDMA system, each wireless base station has a common channel which mobile terminals can use in common, and an individual channel assigned to each mobile terminal. Each wireless base station notifies mobile terminals under its wireless area of broadcast information like a scrambling code of the wireless base station through the common channel. The wireless area established by each wireless base station, in general, indicates the range which the common channel can reach. If the wireless areas established by wireless base stations overlap, i.e. when radio waves emitted from wireless base stations reach a same space, radio wave interference occurs. In order to avoid such radio wave interference, the new base station 100 according to the present exemplary embodiment autonomously determines the transmission power of the common channel before performing transmission of the common channel.

More in detail, the new base station 100 performs transmission of a PRACH (Physical Random Access Channel) to the neighboring base stations 200 to 400. In the W-CDMA system, the PRACH is a connection request signal transmitted when a mobile terminal makes a wireless-link connection request to a wireless base station. The PRACH includes one or more preamble signals and message parts. A preamble signal is a signal for detecting a spread code and reception timing of a wireless base station and a mobile terminal. The neighboring base stations 200 to 400, when detecting a preamble signal received from the new base station 100, performs synchronization of the spread code and reception timing to transmit an AICH (Acquisition Indication Channel) to the new base station 100. In the W-CDMA system, the AICH is a response signal from a wireless base station, to a connection request from a mobile terminal. The AICH includes the ACK (acknowledgment) and the NACK (non-acknowledgment) for a connection request. The new base station 100, when receiving an AICH, detects that the connection request with the use of a preamble signal the PRACH has been received by the neighboring base stations 200 to 400. The new base station 100 transmits a preamble signal of a PRACH to each of the neighboring base stations 200 to 400 in order, and judges whether an AICH is received or not from the neighboring base stations 200 to 400. When the new base station 100 can receive the AICH from the neighboring base stations 200 to 400, the new base station 100 stores the transmission power with which the preamble signal of the PRACH is transmitted. Based on the transmission power, the new base station 100 determines the transmission power of the common channel. In the present exemplary embodiment as explained above, the new base station 100 determines the transmission power of the common channel by performing transmission and reception of a preamble signal of the PRACH and the AICH with each of the neighboring base stations 200 to 400 by using the same method as a mobile terminal accessing the wireless communication system. In the following description, a preamble signal of the PRACH is referred to as a connection request signal, and for the AICH, it is referred to as a response signal.

The new base station 100, in transmitting a connection request signal, receives a common channel transmitted from the neighboring base stations 200 to 400, and acquires a BCH (Broadcast channel) of each of the neighboring base stations 200 to 400. The BCH includes a scrambling code of each of the neighboring base stations 200 to 400. In the W-CDMA system, a mobile terminal receives a common channel from a wireless base station and performs the 3-step cell search (see Japanese Patent Application Publication JP-P2005-223466A and Japanese Patent Application Publication JP-P2004-222152A), to acquire the BCH. In the present exemplary embodiment, the new base station 100 acquires the BCH of each of the neighboring base stations 200 to 400 by using the same method as the mobile terminal. The new base station 100 transmits a connection request signal to each neighboring base station by using a scrambling code included in the BCH. In the following description, the BCH is referred to as broadcast information. In this way, the new base station 100 according to the present exemplary embodiment can acquire broadcast information of each of the neighboring base stations 200 to 400 and individually transmit a connection request signal to each neighboring base station, by performing the same processing as a mobile terminal. Here, neighboring base stations are all the wireless base stations from which the new base station 100 can receive a common channel, among wireless base stations present in the wireless communication system. However, neighboring base stations do not necessarily need to include all the wireless base stations from which a common channel can be received. It is also possible to define a base station with a preliminary set constant threshold value or more in the reception power of the common channel which the new base station 100 receives as a neighboring base station. It is also possible for the new base station 100 to acquire information for determining neighboring base stations from a higher-level device of a wireless communication system.

The new base station 100 transmits a connection request signal to each neighboring station while gradually changing the transmission power (with which the connection request signal is transmitted) from a preliminarily-set low value to a high value until a response signal is received from each neighboring base station. That is to say, the new base station 100, when a response signal cannot be received from neighboring base stations after transmitting a connection request signal with transmission power of a certain value, retransmits a connection request signal with transmission power of a value higher than the previous value. The new base station 100 repeats such operation to each neighboring base station individually. The new base station 100, after receiving a response signal which corresponds to a connection request signal from each neighboring base station, stops retransmission of the connection request signal. The new base station 100 stores the transmission power of the connection request signal at the time of reception of the response signal from each neighboring base station (hereinafter referred to as a response time transmission power). The response time transmission power is the lowest transmission power at which the new base station 100 can receive a response signal from a neighboring base station. The new base station 100 can determine the response time transmission power for each neighboring base station by transmitting a connection request signal to each neighboring base station individually. Note that the new base station 100 may store the response time transmission power determined by performing the above operation only once for each neighboring base station, may store the minimum value among response time transmission powers determined more than once by performing the above operation more than once, or may store the average value of response time transmission powers determined more than once. The new base station 100 repeats the above operation for each neighboring base station and determines the response time transmission power of each neighboring base station. Here, the new base station 100 determines the response time transmission power basically for every neighboring base station. However, the new base station 100 does not necessarily need to determine the response time transmission power for every neighboring base station. For example, when there exists a neighboring base station with a clearly greater value of reception power of the common channel compared with other neighboring base stations, the new base station 100 may determine the response time transmission power of only that neighboring base station. This is because if radio interference with that neighboring base station can be avoided, it is possible to consider that radio interference with other neighboring base stations does not need to be considered. Therefore, it is possible for the new base station 100 to just determine the response time transmission power of at least one neighboring base station among a plurality of neighboring base stations. As a result, in the new base station 100, the operation of determining the response time transmission power can be reduced. In the following description, it is assumed that the response time transmission powers for all neighboring base stations are determined.

The new base station 100, after finishing storing response time transmission powers for all neighboring base stations, determines the response time transmission power which is the smallest transmission power value (hereinafter referred to as the minimum response time transmission power) among response time transmission powers. The new base station 100 determines the transmission power of the common channel based on the minimum response time transmission power. The minimum response time transmission power is the smallest value among response time transmission powers with which each neighboring base station can receive a transmission wave transmitted by the new base station 100. Therefore, the new base station 100 can establish the wireless area while reducing interference with a transmission wave of each neighboring base station (and a transmission wave of the new base station 100) by determining the transmission power of the common channel with the minimum response time transmission power as a reference.

The new base station 100 calculates the transmission power of the common channel based on the minimum response time transmission power. The new base station 100 calculates the transmission power of the common channel based on the following expression (1).

$$Ptx\_i = \alpha i \times Ppre + \beta i \quad (1)$$

In the expression (1):
i (i=0, 1, 2, . . . , (N−1)) is a common channel number (N is the number of common channels);
Ptx_i is a transmission power for each common channel;
Ppre is a minimum response time transmission power; and
$\alpha i$ and $\beta i$ are real coefficients of each common channel.

"$\alpha$" and "$\beta$", which are coefficients preliminarily set for each common channel, are values determined based on a large volume of statistical data. The new base station 100 sets the transmission power of the common channel thus calculated to perform transmissions of a common channel. In practice, the new base station 100 sets the transmission power "Ptx_i" of each common channel at a value lower than the minimum response time transmission power Ppre, based on "$\alpha$" and "$\beta$" which are real coefficients of each common channel. This is because the minimum response time transmission power is a transmission power with which a transmission wave from the new base station 100 reaches a certain neighboring base station, and transmitting a common channel with the same value as (or a value higher than) the minimum response time transmission power will cause interference with a transmission wave of a certain neighboring base station. In this way, the new base station 100 according to the present exemplary embodiment sets the transmission power of the common channel to perform transmission of the common channel.

The above is the description of the configuration of the wireless communication system having wireless base stations according to the present exemplary embodiment.

[Description of a Configuration of a Wireless Base Station]

Figure 2:
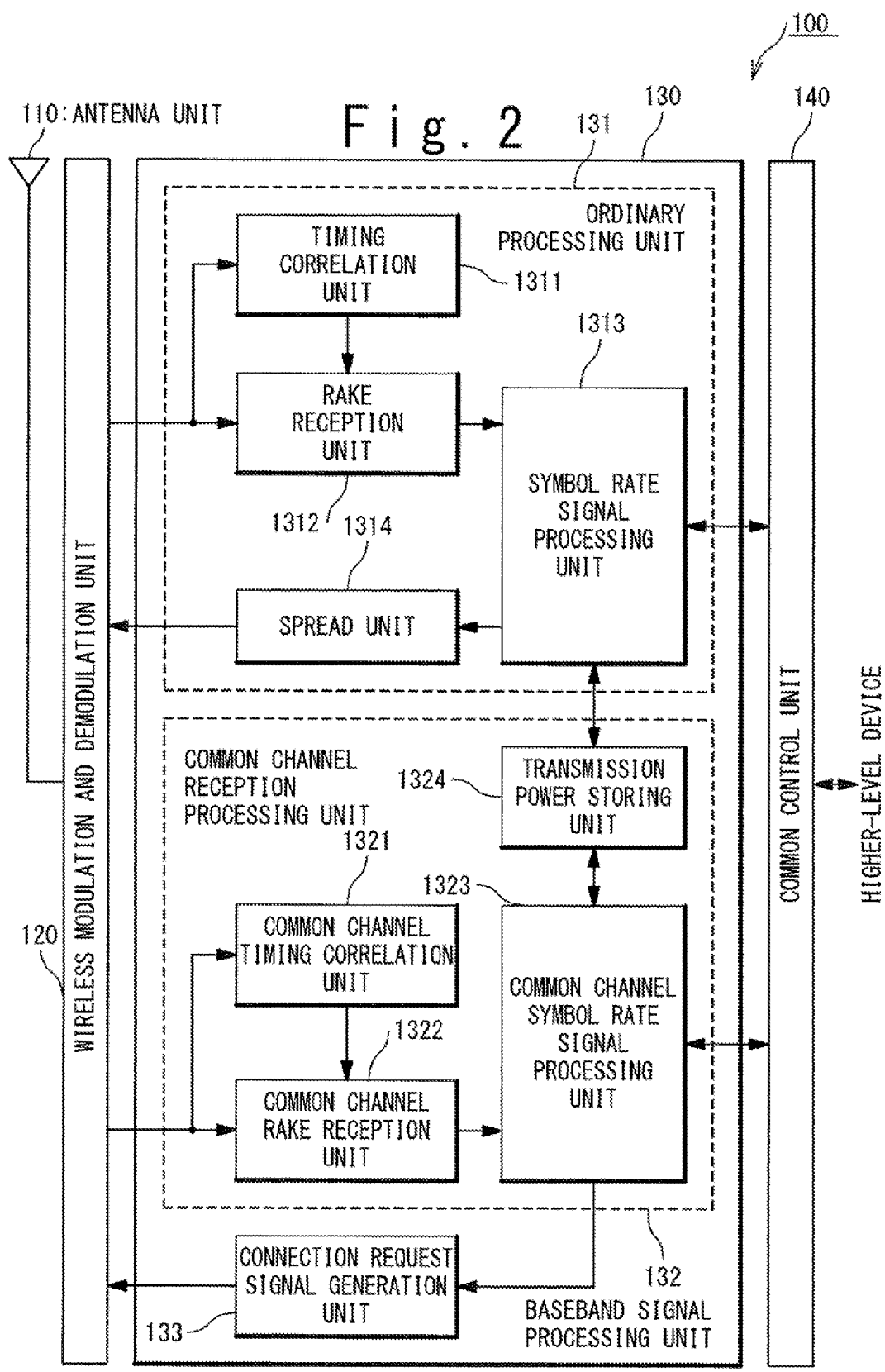
FIG. 2 is a functional block diagram showing a configuration of a new base station 100 according to the present exemplary embodiment.

Next, a configuration of a wireless base station according to the present exemplary embodiment will be described with reference to FIG. 2. The description will be given below with the new base station 100 as an example. FIG. 2 is a functional block diagram showing a configuration of the new base station 100 according to the present exemplary embodiment. The new base station 100 according to the present exemplary embodiment has an antenna unit 110, a wireless modulation and demodulation unit 120, a baseband processing unit 130, and a common control unit 140. The baseband signal processing unit 130 has an ordinary processing unit 131, a common channel reception processing unit 132, and a connection request signal generation unit 133. Each unit of the new base station 100 will be described below.

First, the antenna unit 110 will be described. The antenna unit 110 receives a radio signal transmitted by a mobile terminal or the neighboring base stations 200 to 400, and outputs the reception signal to the wireless modulation and demodulation unit 120. The antenna unit 110 receives a transmission signal from the wireless modulation and demodulation unit 120 and transmits the transmission signal as a radio signal.

Next, the wireless modulation and demodulation unit 120 will be described. The wireless modulation and demodulation unit 120 inputs a reception signal from the antenna unit 110 and demodulates the reception signal to a baseband signal, to output the baseband signal to the baseband signal processing unit 130. The wireless modulation and demodulation unit 120 inputs a baseband signal from the baseband signal processing unit 130 and performs modulation processing to the baseband signal to output a modulation signal to the antenna unit 110 as a transmission signal.

Next, the ordinary processing unit 131 will be described. The ordinary processing unit 131 has a timing correlation unit 1311, a RAKE reception unit 1312, a symbol rate signal processing unit 1313, and a spread unit 1314. Each unit of the ordinary processing unit 131 will be described.

First, the timing correlation unit 1311 inputs a baseband signal from the wireless modulation and demodulation unit 120. The timing correlation unit 1311 detects path timing based on the baseband signal. The timing correlation unit 1311 notifies the RAKE reception unit 1312 of the path timing.

Next, the RAKE reception unit 1312 inputs a baseband signal from the wireless modulation and demodulation unit 120. The RAKE reception unit 1312 inputs path timing from the timing correlation unit 1311. The RAKE reception unit 1312 performs de-spread processing and path diversity processing to a baseband signal by using the path timing, to acquire symbol data. The RAKE reception unit 1312 outputs the symbol data to the symbol rate signal processing unit 1313.

Next, the symbol rate signal processing unit 1313 inputs symbol data from the RAKE reception unit 1312 and performs error correction processing and deinterleave processing to the symbol data to acquire reception data. The symbol rate signal processing unit 1313 outputs the reception data to the common control unit 140. The symbol rate signal processing unit 1313 inputs transmission data from the common control unit 140 and performs error correction coding processing and interleave processing to the transmission data to generate symbol data. The symbol rate signal processing unit 1313 outputs a transmission symbol to the spread unit 1314.

Next, the spread unit 1314 inputs the transmission symbol from the symbol rate signal processing unit 1313 and performs spread spectrum processing to the transmission symbol to acquire a baseband signal. The spread unit 1314 outputs the baseband signal to the wireless modulation and demodulation unit 120. The above is the description of the ordinary processing unit 131.

Next, the common control unit 190 will be described. The common control unit 140 is an interface with a higher-level device in the wireless communication system. The common control unit 140 performs control of each unit of the new base station 100. The common control unit 140 inputs reception data from the baseband signal processing unit 130 and transmits the reception data to the higher-level device. The common control unit 140 inputs transmission data from the higher-level device and outputs the transmission data to the baseband signal processing unit 130.

Next, the common channel reception processing unit 132 will be described. The common channel reception processing unit 132 has a common-channel timing correlation unit 1321, a common-channel RAKE reception unit 1322, a common-channel symbol rate signal processing unit 1323, and a transmission power storing unit 1329. Each unit of the common channel reception processing unit 132 will be described below.

First, the common-channel timing correlation unit 1321 inputs a baseband signal from the wireless modulation and demodulation unit 120. Based on the baseband signal, the common-channel timing correlation unit 1321 performs the aforementioned 3-step cell search and detects path timing, and scrambling code of a neighboring base station which has transmitted a reception signal. The common-channel timing correlation unit 1321 notifies the common-channel RAKE reception unit 1322 of the path timing and the scrambling code.

Next, the common-channel RAKE reception unit 1322 inputs a baseband signal from the wireless modulation and demodulation unit 120. The common-channel RAKE reception unit 1322 inputs path timing and a scrambling code from the common-channel timing correlation unit 1321. The common-channel RAKE reception unit 1322 performs de-spread processing and path diversity processing to the baseband signal by using the path timing to acquire symbol data. The common-channel RAKE reception unit 1322 outputs the symbol data to the common-channel symbol rate signal processing unit 1323.

Next, the common-channel symbol rate signal processing unit 1323 inputs symbol data from the common-channel RAKE reception unit 1322 and performs error correction processing and deinterleave processing to the symbol data to acquire reception data. The common-channel symbol rate signal processing unit 1323 acquires broadcast information from the reception data. The common-channel symbol rate signal processing unit 1323 instructs the connection request signal generation unit 133 to transmit a connection request signal based on the broadcast information. The common-channel symbol rate signal processing unit 1323 determines the transmission power with which a connection request signal is transmitted.

The common-channel symbol rate signal processing unit 1323, after instructing transmission of a connection request signal, judges whether a response signal which corresponds to the connection request signal is received or not from reception data. When a response signal can be acquired from a neighboring base station to which a connection request signal is transmitted, the common-channel symbol rate signal processing unit 1323 stores the transmission power of the connection request signal most recently transmitted in the transmission power storing unit 1324 as the response time transmission power in correspondence to the neighboring base station. On the other hand, when a response signal cannot be acquired from a neighboring base station to which a connection request signal is transmitted, the common-channel symbol rate signal processing unit 1323 instructs the connection request signal generation unit 133 to retransmit the connection request signal. At this time, the common-channel symbol rate signal processing unit 1323 determines the transmission power for retransmitting the connection request signal so that its transmission power is higher than the transmission power of the transmission at the last time. When the transmission power of the connection request signal is set at the maximum value in a case where a response signal cannot be acquired from a neighboring base station to which a connection request signal is transmitted, the common-channel symbol rate signal processing unit 1323 stores the maximum transmission power value as a response time transmission power in the transmission power storing unit 1324 in correspondence to the neighboring base station.

The common-channel symbol rate signal processing unit 1323, after finishing storing response time transmission powers for all neighboring base stations in the transmission power storing unit 1324, determines the minimum response time transmission power among the response time transmission powers recorded in the transmission power storing unit 1324. The common-channel symbol rate signal processing unit 1323, after determining the minimum response time transmission power, calculates the common channel transmission power from the minimum response time transmission power by using the aforementioned expression (1). The common-channel symbol rate signal processing unit 1323 stores the common channel transmission power in the transmission power storing unit 1324.

Next, the transmission power storing unit 1324 stores response time transmission powers in correspondence to the neighboring base stations. The transmission power storing unit 1324 stores a minimum response time transmission power and a common channel transmission power. The transmission power storing unit 1324 inputs a response time transmission power of each neighboring base station, a minimum response time transmission power, and a common channel transmission power from the common-channel symbol rate signal processing unit 1323, and stores the information thereof. The transmission power storing unit 1324, when a common channel is transmitted from the new base station 100, notifies the symbol rate signal processing unit 1313 of a common channel transmission power. The above is the description of the common channel reception processing unit 132.

Next, the connection request signal generation unit 133 will be described. The connection request signal generation unit 133 generates a connection request signal based on an instruction from the common-channel symbol rate signal processing unit 1323. The connection request signal generation unit 133 outputs the connection request signal to the wireless modulation and demodulation unit 120. In the present exemplary embodiment, the connection request signal generation unit 133 generates a connection request signal in the same way as a mobile terminal, based on the W-CDMA system provided by the 3GPP. For this reason, detailed description of generation of a connection request signal by the connection request signal generation unit 133 will not be given.

As explained above, the new base station 100 according to the present exemplary embodiment can receive responses from the neighboring base stations 200 to 400 in the same way as a mobile terminal accessing the wireless communication system. For this reason, the neighboring base stations 200 to 400, when receiving a connection request signal from the new base station 100, can respond in the same way as a case where a connection request signal is received from a mobile terminal with conventional processing.

The function of the new base station 100 may be achieved by hardware, software, or combination of hardware and software. When the function of the new base station 100 is achieved by software, a program for processing for achieving the function of the new base station 100 is recorded in a storage unit which includes a RAM (Random Access Memory) and a ROM (Read Only Memory) (not shown). A processing unit which includes a CPU (Central Processing Unit) (not shown), reads and executes such a program for processing, to achieve the function of the new base station. A processing program can be recorded in a storage medium provided outside the new base station 100. A recording medium widely includes such a recording medium as a hard disc of a server provided to administer the wireless communication system (not shown), a portable CD (Compact Disc), and a USB (Universal Serial Bus) memory having a flash memory. In such a case, a program for processing is introduced into the new base station 100 from a recording medium through wireless communication or wire communication. The above is the description of the configuration of the new base station 100 according to the present exemplary embodiment.

[Description of an Operation Method of a Wireless Base Station]

Figure 3:
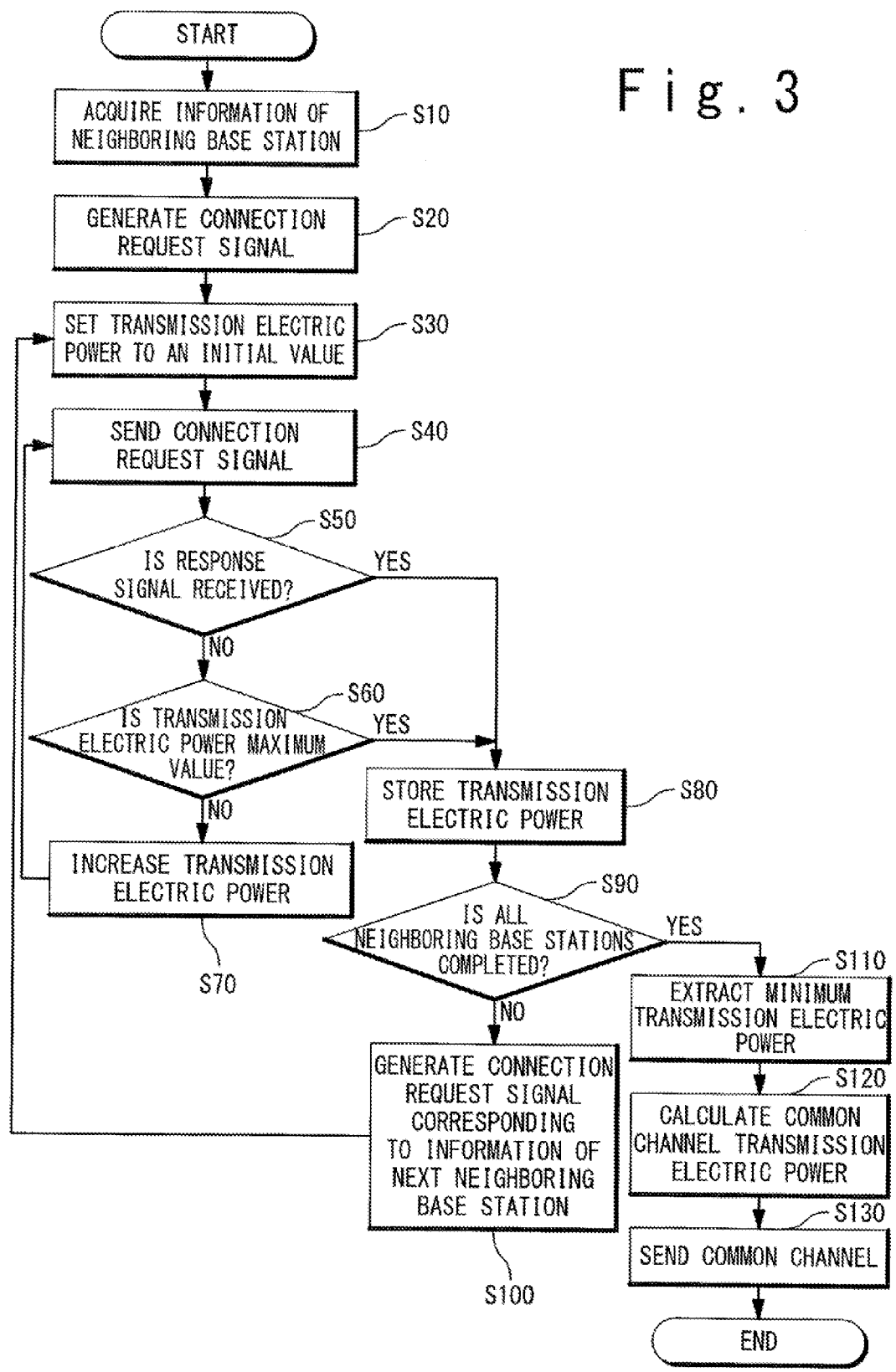
FIG. 3 is an operational flow diagram of the new base station 100 in the wireless communication system according to the present exemplary embodiment.
Figure 4D:
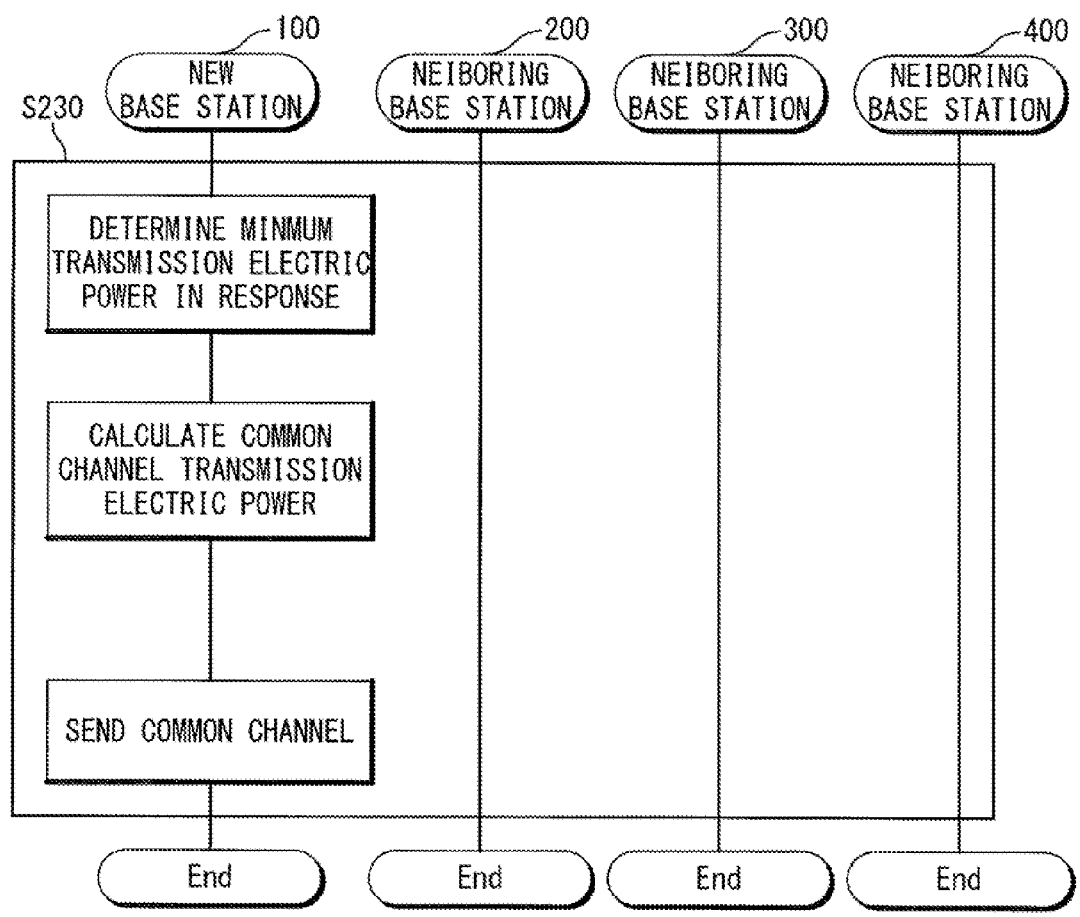
FIG. 4D is a transmission power determining sequence performed between the new base station 100 and the neighboring base stations 200 to 400 according to the present exemplary embodiment.

Next, an operation method of the new base station 100 according to the present exemplary embodiment will be described. FIG. 3 shows an operational flow diagram of the new base station 100 in the wireless communication system according to the present exemplary embodiment.

(Step S10)

The common-channel symbol rate signal processing unit 1323 receives a common channel transmitted from the neighboring base stations 200 to 400 and acquires broadcast information. Radio waves transmitted from the neighboring base stations 200 to 400 are received by the antenna unit 110 and inputted into the common-channel symbol rate signal processing unit 1323 as symbol data as a result of reception processing by the wireless modulation and demodulation unit 120, the common-channel timing correlation unit 1321, and the common-channel RAKE reception unit 1322. The common-channel symbol rate signal processing unit 1323 acquires reception data from the symbol data, and acquires broadcast information included in the reception data. An operation method in which the new base station 100 acquires broadcast information from a common channel transmitted by the neighboring base stations 200 to 400, follows the W-CDMA system provided by the 3GPP and will not be described in detail.

(Step S20)

The connection request signal generation unit 133 generates a connection request signal. The common-channel symbol rate signal processing unit 1323 selects one station (hereinafter referred to as a selected neighboring base station) from the detected neighboring base stations 200 to 400, based on acquired broadcast information. The connection request signal generation unit 133 generates a connection request signal based on broadcast information which corresponds to a selected neighboring base station. An operation method in which the new base station 100 generates a connection request signal follows the W-CDMA system provided by the 3GPP and will not be described in detail.

(Step S30)

The common-channel symbol rate signal processing unit 1323 sets the transmission power of the connection request signal to an initial value. An initial value of a transmission power is assumed to be preliminarily set by an administrator of the wireless communication system. The common-channel symbol rate signal processing unit 1323 stores the transmission power value of a connection request signal.

(Step S40)

The connection request signal generation unit 133 transmits a connection request signal. The connection request signal generation unit 133 transmits a connection request signal to the selected neighboring base station through the wireless modulation and demodulation unit 120 and the antenna unit 110 with the transmission power set by the common-channel symbol rate signal processing unit 1323.

(Step S50)

The common-channel symbol rate signal processing unit 1323 judges whether a response signal has been received from the selected neighboring base station. The common-channel symbol rate signal processing unit 1323 judges whether a response signal has been received from the selected neighboring base station within a preliminarily-set period from the time when a connection request signal is transmitted by the connection request signal generation unit 133. When a response signal can be received from the selected neighboring base station, the process proceeds to the step S80. When a response signal cannot be received from the selected neighboring base station on the other hand, the process proceeds to the step S60.

(Step S60)

When a response signal cannot be received from the selected neighboring base station, the common-channel symbol rate signal processing unit 1323 judges whether the previous set value of the transmission power of the connection request signal is the maximum value or not. When the set value of the transmission power is the maximum value, the process proceeds to the step S80. When the set value of the transmission power is not the maximum value, the process proceeds to the step S70.

(Step S70)

When the last transmission power of the connection request signal is not the maximum value, the common-channel symbol rate signal processing unit 1323 sets the transmission power at a value higher than the previous transmission power stored in the step S40 by a single level. The rise width at the time of raising the set value of the transmission power is assumed to be preliminarily set by an administrator of the wireless communication system. The common-channel symbol rate signal processing unit 1323, after raising the set value of the transmission power by a single level, updates the stored value of the transmission power. After that, the process returns to the step S40 in order to transmit a connection request signal again.

(Step S80)

When a response signal can be received from a selected neighboring base station, the common-channel symbol rate signal processing unit 1323 stores the last set value of the transmission power of the connection request signal in the transmission power storing unit 1324 in correspondence to the selected neighboring base station as a response time transmission power. In the above description of the operation method, the common-channel symbol rate signal processing unit 1323 determines the response time transmission power for a selected neighboring base station only once. However, the response time transmission power may be determined more than once. When acquiring the response time transmission power more than once, the common-channel symbol rate signal processing unit 1323 may determine the response time transmission power by selecting the minimum value from values acquired more than once, or may determine the response time transmission power by calculating the average value of values acquired more than once. Further, the common-channel symbol rate signal processing unit 1323 stores the maximum value of the transmission power in the transmission power storing unit 1324 as the response time transmission power when the last set value of the transmission power of a connection request signal is the maximum value even when the response signal cannot be received from a selected neighboring base station.

(Step S90)

The common-channel symbol rate signal processing unit 1323 judges whether the response time transmission powers for all the neighboring base stations 200 to 400 detected in the step S10 are stored. When storage of response time transmission powers for all the neighboring base stations is completed, the process proceeds to the step S110. When storage of response time transmission powers for all the neighboring base stations is not completed on the other hand, the process proceeds to the step S100.

(Step S100)

When storage of the response time transmission powers for all the neighboring base stations is not completed, the common-channel symbol rate signal processing unit 1323 selects any of the neighboring base stations 200 to 400 which have not undergone processing as the selected neighboring base station. The connection request signal generation unit 133 generates a connection request signal based on broadcast information of a newly-selected selected neighboring base station. In this case, the process returns to the step S30.

(Step S110)

When storage of the response time transmission powers for all the neighboring base stations is completed, the common-channel symbol rate signal processing unit 1323 determines the minimum value of the response time transmission power (minimum response time transmission power) from response time transmission powers stored in the transmission power storing unit 1324.

(Step S120)

The common-channel symbol rate signal processing unit 1323 calculates the common channel transmission power based on the minimum response time transmission power. The common-channel symbol rate signal processing unit 1323, after determining the minimum response time transmission power, calculates the common channel transmission power from the minimum response time transmission power by using the aforementioned expression (1). The common-channel symbol rate signal processing unit 1323 stores the calculated common channel transmission power in the transmission power storing unit 1324.

(Step S130)

The symbol rate signal processing unit 1313 performs transmission of the common channel. The symbol rate signal processing unit 131, after receiving a transmission instruction of the common channel from a higher-level device of the wireless communication system, reads out the common channel transmission power stored in the transmission power storing unit 1324 and sets the common channel transmission power as the transmission power of the common channel. The symbol rate signal processing unit 1313 performs transmission of the common channel from the antenna unit 110 through transmission processing by the spread unit 1314 and the wireless modulation and demodulation unit 120.

The above is the description of the operational flow of the new wireless base station 100 in the wireless communication system according to the present exemplary embodiment. It is possible for every wireless base station in the wireless communication system according to the present exemplary embodiment to determine the transmission power of the common channel with the above operational flow. In this way, the new base station 100 can transmit a connection request signal to each of the detected neighboring base stations 200 to 400 individually to determine the response time transmission power by using a same method as a mobile terminal. The new base station 100 determines the minimum response time transmission power from the response time transmission powers which correspond to the neighboring base stations 200 to 400, and further determines a transmission power lower than the minimum response time transmission power, as the transmission power of the common channel by using the aforementioned expression (1). Consequently, the common channel transmitted from a new base station 100 can be prevented from interfering with the common channel transmitted from neighboring base stations 200 to 400.

[Description of a Transmission Power Determining Sequence]

Next, a transmission power determining sequence performed between a new base station 100 and neighboring base stations 200 to 400 according to an exemplary embodiment will he described by using FIG. 4A to FIG. 4D. FIG. 4A to FIG. 4D show a transmission power determining sequence performed between the new base station 100 and the neighboring base stations 200 to 400. In the following description, the new base station 100 is assumed to have preliminarily acquired broadcast information of the neighboring base stations 200 to 400. The new base station 100 acquires a response time transmission power three times for each neighboring base station and stores an average value of the three values as the response time transmission power.

(Step S200)

The new base station 100 transmits a connection request signal to a neighboring base station 200 (selected neighboring base station) arbitrarily selected from the neighboring base stations 200 to 400. Since a response signal cannot be received from the neighboring base station 200, the new base station 100 retransmits a connection request signal while raising the set value of the transmission power of the connection request signal. The neighboring base station 200 receives third retransmission of a connection request signal from the new base station 100. The neighboring base station 200 transmits a response signal to the new base station 100. The new base station 100, when receiving the response signal from the neighboring base station 200, stores the last transmission power for transmitting the connection request signal as the first-time response time transmission power. The new base station 100 repeats the same operation three times for the neighboring base station 200. As shown in FIG. 4A, the new base station 100, when receiving a response signal from the neighboring base station 200 at the second time and the third time, stores previous transmission powers for transmitting the connection request signal, as second-time and third-time response time transmission powers. The new base station 100, after storing the third-time response time transmission power, stops transmission of the connection request signal. The new base station 100 calculates an average value of the stored first-time to third-time response time transmission powers for the neighboring base station 200. The new base station 100 calculates the average value of the first-time to third-time response time transmission powers for the neighboring base station 200, as the response time transmission power for the neighboring base station 200.

(Step S210)

The new base station 100, after determining a response time transmission power for the neighboring base station 200, judges whether determination of response time transmission powers for all the neighboring base stations has been completed. In the present exemplary embodiment, the neighboring base stations 300 and 400 are also present. Therefore, the new base station 100 selects the neighboring base station 300 (selected neighboring base station) from the neighboring base stations 300 and 400. The new base station 100 transmits a connection request signal to the neighboring base station 300. The new base station 100 retransmits a connection request signal while raising the set value of the transmission power until the response signal is received from the neighboring base station 300. As shown in FIG. 4B, the new base station 100, at the first time, receives a response signal from the neighboring base station 300 when retransmitting the fifth connection request signal. In the same way, a response signal, at the second time, is received from the neighboring base station 300 after retransmitting the third connection request signal, and after retransmitting the fourth connection request signal at the third time. The new base station 100 stops transmission of a connection request signal after storing the three-times response-time transmission powers. The new base station 100 calculates an average value of the stored first-time to third-time response time transmission powers for the neighboring base station 300. The new base station 100 determines the average value of the first-time to third-time response time transmission powers for the neighboring base station 300 as the transmission power for the neighboring base station 300.

(Step S220)

The new base station 100, after determining the response time transmission power for the neighboring base station 300, judges whether determination of response time transmission powers for all the neighboring base stations has been completed. In the present exemplary embodiment, the neighboring base station 400 is also present. Therefore, the new base station 100 selects the neighboring base station 400 (selected neighboring base station) and transmits a connection request signal. The new base station 100 retransmits a connection request signal while raising the set value of the transmission power until the response signal is received from the neighboring base station 400. As shown in FIG. 4C however, the new base station 100 cannot receive the response signal from the neighboring base station 400 even when the connection request signal is transmitted with a transmission power set at the maximum value. In this case, the new base station 100 stores the maximum value of the transmission power as a first-time response time transmission power. Similarly, the new base station 100 cannot receive the response signal from the neighboring base station 400 at the second time and the third time too even when the connection request signal is transmitted with the transmission power set at the maximum value. The new base station 100 stores the maximum value of the transmission power as second-time and third-time response time transmission powers respectively. The new base station 100, after storing the three-times response time transmission powers, stops the connection request signal. The new base station 100 calculates an average value of the stored first-time to third-time response time transmission powers for the neighboring base station 400. The new base station 100 determines the average value of the first-time to third-time response time transmission powers for the neighboring base station 400 as the transmission power for the neighboring base station 400.

(Step S230)

The new base station 100, after determining the response time transmission power for the neighboring base station 400, judges whether determination of response time transmission powers for all the neighboring base stations has been completed. In the present exemplary embodiment, the new base station 100 has completed determination of response time transmission powers for all the neighboring base stations. The new base station 100 judges which is the lowest transmission power value among the determined response time transmission powers for all the neighboring base stations 200 to 400. In the present exemplary embodiment, it is assumed that the value of the response time transmission power for the neighboring base station 200 is the minimum. The new base station 100 determines the response time transmission power for the neighboring base station 200 as the minimum response time transmission power. The new base station 100 calculates each common channel transmission power from the minimum response time transmission power based on the aforementioned expression (1). The new base station 100 stores each common channel transmission power. The new base station 100, after receiving a transmission instruction of the common channel from a higher-level device of the wireless communication system, sets the common channel transmission power to each common channel and performs transmission of the common channel.

The above is the description of the transmission power determining sequence performed between a new base station 100 and neighboring base stations 200 to 400 according to the exemplary embodiment.

As mentioned above, the new base station 100 according to the present exemplary embodiment determines the response time transmission power for each neighboring base station individually, and calculates the transmission power of the common channel based on the minimum response time transmission power which is the lowest transmission power value among response time transmission powers. For this reason, the new base station 100 can autonomously establish a wireless area which does not cause interference in neighboring base stations. The new base station 100 can establish a wireless area without depending on a higher-level device of the wireless communication system.

In the present exemplary embodiment, the case where a wireless base station is newly set has been described. However, it is also possible for each wireless base station already set in a wireless communication system and in operation, to autonomously reestablish a more appropriate wireless area by regularly performing the above operation. It is also possible for each wireless base station, not only to perform autonomous control of a transmission power in units of a wireless base station, but also in a case where a wireless base station establishes a wireless area with a plurality of sectors, to autonomously control the transmission power of the common channel for each sector as a unit.

In the present exemplary embodiment, the description has been given with a wireless communication system using the W-CDMA system as an example. However, the present invention can also be applied to a wireless communication system other than the W-CDMA system using an inquiry signal from a mobile station and a response signal from a base station which correspond to a connection request signal and a response signal, respectively.

Finally, the present invention can have greater effect by being applied not only to macrocell and microcell wireless base stations which are set outdoors and establish wide-range wireless areas, but also to a femtocell wireless base station which is personally set by a user and establishes a wireless area within a narrower range such as a home and an office. In a femtocell wireless base station, it is expected that a setting position is moved within a certain range by users, and that a far greater number than a setting number of macrocell and microcell wireless base stations, is set. For this reason, it is considered that radio wave interference among wireless base stations gets intense. Even in such a situation, it is possible for a wireless base station according to the present invention to autonomously establish an appropriate wireless area in order to effectively establish a wireless communication system with less interference.

Although the present invention has been described above with reference to some exemplary embodiments, the present invention is not limited to the above exemplary embodiments. Various changes which those skilled in the art can understand, may be made to structure and details of the present invention, within a scope of the present invention.

The present application is the National Phase of PCT/JP2009/068807, filed Nov. 4, 2009, which claims priority based upon Japanese Patent Application No. 2008-308788 filed on 3 Dec. 2008, the disclosure of which is all incorporated herein.

The invention claimed is:

1. A wireless base station comprising:
a connection request signal generation unit configured to transmit a connection request signal to a selected neighboring base station selected from neighboring base stations existing around;
a common channel reception processing unit is configured to; when receiving a response signal which corresponds to the connection request signal, from the selected neighboring base station, store a value of transmission power with which the connection request signal is transmitted most recently, as a response time transmission power, in correspondence to the selected neighboring base station; determine a minimum response transmission power of which value is the smallest among at least one response-time transmission power after storing the at least one response-time transmission power for the neighboring base stations; and calculate a transmission power of a common channel with which the wireless base station should transmit, based on the minimum response transmission power; and
an ordinary processing unit configured to perform a transmission through the common channel by using the common channel transmission power.

2. The wireless base station according to claim 1, wherein the common channel reception processing unit is configured to calculate the common channel transmission power based on a following expression:

$$Ptx\_i = \alpha i \times Ppre + \beta i$$

wherein i (I=0, 1, 2, ..., (N−1)) is assumed to be a common channel number (N is the number of the common channel), Ptx_i is assumed to be a transmission power of each common channel, Ppre is assumed to be the minimum response transmission power, αi and βi are assumed to be real coefficients for each common channel.

3. The wireless base station according to claim 1, wherein the common channel reception processing unit is configured to: when not receiving the response signal to the connection request signal from the selected neighboring base station, instruct the connection request signal generation unit to retransmit the connection request signal at a transmission power at a higher value than the connection request signal which is transmitted at a last time by a predetermined value; and when not receiving the response signal from the selected neighboring base station even when transmitting the connection request signal by setting the transmission power at a maximum value, store the maximum value of the transmission power as the response time transmission power, in correspondence to the selected neighboring base station.

4. The wireless base station according to claim 1, wherein the connection request signal generation unit is configured to transmit the connection request signal to the selected neighboring base station in a same manner to a mobile communication terminal which accesses a wireless communication system including the wireless base station.

5. The wireless base station according to claim 1, wherein the common channel reception processing unit is configured to: receive a common channel of the neighboring base stations; obtain a discrimination signal of the neighboring base stations via the common channel; and generate the connection request signal based on the discrimination signal.

6. The wireless base station according to claim 1, wherein the common channel reception processing unit is configured to: obtain the response time transmission power for each of the neighboring stations at a plurality of times as a plurality of response time transmission powers; and store a minimum value among the plurality of response time transmission powers or an average value of the plurality of response time transmission powers as the response time transmission power of the each neighboring station.

7. The wireless base station according to claim 1, wherein the connection request signal generation unit is configured to transmit the connection request signal in accordance with the W-CDMA (Wideband Code Division Multiple Access) system defined in 3GPP (Third Generation Partnership Project), the common channel reception processing unit is configured to detect the response signal based on the W-CDMA system, and the ordinary processing unit is configured to transmit the common channel based on the W-CDMA system.

8. A wireless communication system comprising a plurality of wireless communication base stations, each of which is the wireless communication base station according to claim 1.

9. A transmission power control method comprising:

transmitting a connection request signal to a selected neighboring base station selected from neighboring base stations existing around;

storing, when receiving a response signal which corresponds to the connection request signal, from the selected neighboring base station, a value of transmission power with which the connection request signal is transmitted most recently, as a response time transmission power, in correspondence to the selected neighboring base station;

determining a minimum response transmission power of which value is the smallest among at least one response-time transmission power after storing the at least one response-time transmission power for the neighboring base stations;

calculating a transmission power of a common channel with which the wireless base station should transmit, based on the minimum response transmission power; and performing a transmission through the common channel by using the common channel transmission power.

10. The transmission power control method of the wireless base station according to claim 9, wherein the calculating the transmission power of the common channel comprises:

calculating the common channel transmission power based on a following expression:

$$Ptx\_i = \alpha_i \times Ppre + \beta_i$$

wherein i (I=0, 1, 2, ..., (N−1)) is assumed to be a common channel number (N is the number of the common channel), Ptx_i is assumed to be a transmission power of each common channel, Ppre is assumed to be the minimum response transmission power, $\alpha_i$ and $\beta_i$ are assumed to be real coefficients for each common channel.

11. The transmission power control method of the wireless base station according to claim 9, further comprising:

instructing, when not receiving the response signal to the connection request signal from the selected neighboring base station, the connection request signal generation unit to retransmit the connection request signal at a transmission power at a higher value than the connection request signal which is transmitted at a last time by a predetermined value; and storing, when not receiving the response signal from the selected neighboring base station even when transmitting the connection request signal by setting the transmission power at a maximum value, the maximum value of the transmission power as the response time transmission power, in correspondence to the selected neighboring base station.

12. The transmission power control method of the wireless base station according to claim 9, wherein the transmitting the connection request signal comprises:

transmitting the connection request signal to the selected neighboring base station in a same manner to a mobile communication terminal which accesses a wireless communication system including the wireless base station.

13. The transmission power control method of the wireless base station according to claim 9, further comprising:

receiving a common channel of the neighboring base stations;

obtaining a discrimination signal of the neighboring base stations via the common channel; and generating the connection request signal based on the discrimination signal.

14. The transmission power control method of the wireless base station according to claim 9, wherein the storing from the selected neighboring base station comprises:

obtaining the response time transmission power for each of the neighboring stations at a plurality of times as a plurality of response time transmission powers; and storing a minimum value among the plurality of response time transmission powers or an average value of the plurality of response time transmission powers as the response time transmission power of the each neighboring station.

15. A non-transitory computer readable medium that stores a program, the program causing a computer to execute the transmission power control method according to claim 9.

* * * * *